United States Patent Office 3,384,506
Patented May 21, 1968

3,384,506
HYDROPHILIC URETHANE COMPOSITIONS AND PROCESS FOR PREPARATION OF MOISTURE CONTAINING BREATHABLE FABRICS
Harold L. Elkin, Levittown, Pa., assignor to Thiokol Chemical Corporation, Bristol, Pa., a corporation of Delaware
No Drawing. Filed May 18, 1964, Ser. No. 368,378
10 Claims. (Cl. 117—62)

ABSTRACT OF THE DISCLOSURE

Hydrophilic urethane compositions are provided, with a process for their use, wherewith fabrics may be coated and/or impregnated to further provide moisture containing breathable fabrics.

This invention relates to novel hydrophilic urethane compositions useful in the coating and/or impregnation of fabrics, to the novel moisture-containing breathable fabrics thereby produced, and to the novel processes for forming said compositions and fabrics. In particular, this invention relates to novel, liquid coating and/or impregnating urethane compositions, which comprise at-least-partially-blocked polyethylene glycol polyether polyurethane prepolymers and curing agents therefor in intimate uniform admixture; to the process for preparing said compositions; to moisture-containing, coated and/or impregnated breathable fabrics prepared with said compositions; and to the process for preparing said fabrics.

It is an object of this invention to provide coating and/or impregnating fabric-treatment urethane compositions which impart static-resistant qualities to fabrics treated therewith.

Another object of this invention is to provide coating and/or impregnating fabric-treatment urethane compositions which impart enhanced softness, better drape and more luxurious handle to fabrics treated therewith and yet retain their qualities of breathability.

Another object of this invention is to provide novel static-resistant breathable fabrics of enhanced softness, better drape and more luxurious handle.

Yet another object of this invention is to provide a novel process for producing static-resistant breathable fabrics of enhanced softness, better drape and more luxurious handle.

These objects and those others which are evident from or inherent in the following discussion and examples are attained through the formation and use of the novel compositions, processes and coated and/or impregnated fabrics of this invention as revealed herein.

According to the present invention, fabrics are made substantially resistant to the accumulation of static electricity and have enhanced softness, better drape and increased luxuriousness of handle and retain their qualities of breathability when they are treated with organic at-least-partially-blocked hydrophilic polyurethane polymer fabric treatment compositions of this invention. The fabrics show increases in weight upon exposure to water-moisture, such as to the water-moisture ordinarily present in the air, and upon such increases are unexpectedly rendered superior to untreated fabrics in those desirable qualities enumerated above. Preferred hydrophilic fabric treatment compositions of this invention are liquid solutions or emulsions of curable at-least-partially-blocked polyurethane prepolymers, and curing agents therefor, wherein such polyurethane prepolymers are formed from a preponderance of polyethylene glycols and organic diisocyanates. By preponderance is meant that at least about 25% by weight of the non-diisocyanate formed portions of the prepolymer are composed of polyethylene glycol polyether units. The preferred compositions of this invention which provide breathable, moisture-containing, static-resistant fabrics are:

(a) at-least-partially-blocked polyether polyurethane prepolymers prepared by reaction of
  (i) polyglycols, at least 25% by weight of which are polyethylene glycols having molecular weights from about 200 to about 6,000, with an organic diisocyanate, in such quantities as to provide an isocyanate-terminated polyurethane prepolymer with a reactive isocyanate content of about 1% to about 16% by weight of said prepolymer, and
  (ii) heat-labile, active-hydrogen bearing, organic blocking compounds selected from among the relatively low molecular weight ketoximes, imines, and oximes, and in such quantities as to provide a ratio in equivalents of reactive isocyanate as present in the prepolymer, to equivalents of active hydrogen as present in the blocking agent ($-NCO/-OH_B$) of from 0.5 to 2.0; and these
(b) intimately admixed with
  (i) a polyurethane prepolymer curing agent, the latter in such quantities as to provide a ratio in equivalents of reactive isocyanate, as present in the prepolymer prior to the blocking reaction, to equivalents of active hydrogen as present in the curing agent ($-NCO/-OH_C$) of from 0.6 to 1.5; and with
  (ii) a volatile, non-reactive liquid diluent in such quantities so as to provide a uniform liquid solution or emulsion composition having a weight percent solids content of from about 0.5% to 100%.

It has been unexpectedly found that where fabrics are treated by (a) wetting them with the novel fabric treatment compositions of this invention;
(b) heating the wetted fabrics to a temperature of at least 180° F. for the time required to substantially unblock the prepolymer, cure the prepolymer to a solid polymer, and divest through volatilization the now coated and/or impregnated fabrics of liquid diluent, where present, to provide substantially dry coated and/or impregnated fabrics; and
(c) subjecting the treated fabrics to an environment of water-moisture at least equivalent to that contained in air of at least 50% relative humidity at 73° F. for the time required to provide an increase in weight of the treated fabrics of at least 10% and preferably at least 50% of that of the cured polymer therein;

that the novel moisture-containing, static resistant treated fabrics of this invention are provided which exhibit substantially increased resistance to the accumulation of static electricity, and yet also show substantially enhanced qualities of softness, drape and luxuriousness of handle over that of untreated fabrics. Where at-least-partially-blocked prepolymer containing compositions are used, breathable fabrics with the foregoing desirable properties are provided. By "breathable" fabrics is meant that such fabrics will easily permit the passage therethrough of gases, water vapor, etc., and not provide a substantial barrier thereto. This quality is a highly desirable one where, for example, these fabrics are used for making clothing. By "equivalent" is meant molar equivalent.

Active isocyanate-containing hydrophilic polyurethane prepolymers are employed in the practice of this invention which contain polyether units from polyethylene glycol, which units amount to at least 25% by weight of the non-diisocyanate formed portions of the prepolymer. Where prepolymers have less than 25% by weight of polyether units from polyethylene glycol, the compositions and treated fabrics subsequently prepared therefrom show an inadequate ability to provide substantial static-resistance, and inadequate improvements in softness, drape and handle over untreated fabrics with regard to the objectives of this invention. Prepolymers having at least 25% by weight of polyether units from polyethylene glycol are generally designated herein as "polyethylene glycol polyether polyurethane prepolymers." The polyethylene glycols which may be used, according to this invention, to prepare useful polyethylene glycol polyether polyurethane prepolymers are those which have molecular weights from 200 to 6,000. Where the polyethylene glycols fall below 200 in molecular weight, compositions are obtained which provide treated fabrics that are too stiff or boardy to attain the objectives of this invention. The preferred polyethylene glycols for use in this invention have molecular weights of from about 1,000 to 4,500.

Organic diisocyanates in excess of stoichiometric amounts are reacted with the polyethylene glycols and such other di- and polyfunctional active hydrogen bearing molecules that may form up to 75% of the prepolymers, such as polyester dialcohols, other polyether dialcohols, amino-alcohols, etc., to form useful polyurethane prepolymers which have isocyanate terminals, and a weight percent content of reactive isocyanate of between about 1% to 16%. Useful diisocyanates for this purpose include many arylene diisocyanates, such as the toluene diisocyanates; meta-phenylene diisocyanate; the chlorophenylene diisocyanates; the methylene-bis(phenylisocyanates); naphthalene diisocyanates; dimethoxybiphenylene diisocyanates; paradiphenylmethane diisocyanate; cumene diisocyanate; etc.; the alkylene diisocyanates such as hexamethylenediisocyanate; ethylene diisocyanate; methylene bis(cyclohexamethylene)diisocyanate, viz.

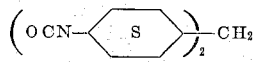

etc.; alicyclic diisocyanates such as furfural diisocyanate; etc. The prepolymer forming reaction is usually conducted at elevated temperatures, say at 200° F. or above.

According to preferred practice of this invention, the prepolymers are at-least-partially-block prior to admixture with the curing agents therefor. Blocking is the reaction of reactive isocyanate groups in the prepolymer with heat-labile active hydrogen bearing blocking compounds, which form heat-sensitive bonds; the then annexed blocking compounds thereby protect the now-blocked isocyanate groups of the prepolymer from further reaction. Upon subsequent moderate heating, the heat-sensitive bonds may be broken and the reactive isocyanate groups of the prepolymer, and the blocking compounds are regenerated. The blocking compounds for use in this invention are the relatively low molecular weight oximes and ketoximes, such as methylmethylketoxime, methylethylketoxime, cyclohexanoneoxime, etc.; and imines, such as ethylenimine, propylenimine, etc. By "relatively low molecular weight" is meant below about 150. The preferred blocking compounds are those which form bonds with the prepolymer which may be broken or unblocked at about 175° F. to 300° F., and include in their number methylethylketoxime and ethylenimine.

The blocking compounds are reacted with the prepolymers, according to this invention, in such quantity to provide a ratio of equivalents of reactive isocyanate in the prepolymer to equivalents of active hydrogen in the blocking compound of from about 0.5 to 2.0

$$(-NCO/-OH_B)$$

thus to provide an at-least-partially-blocked prepolymer. Such a prepolymer has at least one half of its isocyanate groups blocked. The blocking reaction is conducted at elevated temperatures of about 100° F. to not more than 175° F., and preferably at about 130° F. to 160° F. for such periods as may be required to effect blocking of the active isocyanate of the prepolymer, say in from about 1 to 60 minutes.

Curing agents, according to the practice of this invention, are intimately and uniformly admixed with the at-least-partially-blocked polyurethane prepolymers after blocking and prior to application of the treatment compositions of this invention to the fabric.

The useful curing agents are di- and polyfunctional active hydrogen bearing substances, preferably alcohols, and include in their number the difunctional alkylene glycols such as ethylene and propylene glycols; polyalkyleneether glycols, e.g., polyethylene and polypropylene glycols; the trifunctional alcohols, e.g., triisopropanolamine and trimethylolpropane; and tetrafunctional alcohols such as N,N,N',N'-tetrakis(2-hydroxypropyl)ethylenediamine; pentafunctional alcohols such as pentakis(2-hydroxypropyl)diethylenetriamine; etc. The curing agents, in general, form heat resistant bonds with reactive isocyanate groups of the prepolymer. The most preferred curing agents for present use is N,N,N',N'-tetrakis(2-hydroxypropyl)ethylenediamine and N,N,N',N'-tetrakis-(hydroxyethyl)ethylenediamine.

Quantities of the curing agent to be admixed herein are such as to provide ratios of equivalents of reactive isocyanate, as present in the prepolymer prior to its blocking, to equivalents of active hydrogen present in the curing agents used ($-NCO/-OH_C$) of from about 0.6 to 1.5, preferably ratios of about 0.85 to about 1.2, and most preferably a ratio of about 1. Where the ratio is significantly above 1.5, reactive isocyanate remains in such quantity after the curing reaction to subsequently react with the moisture that is provided in the moisture-treatment step of the present fabric treatment process, to form an excessive number of urea linkages in the cured polymer that is bound in the fabric, and an excessive formation and evolution of carbon dioxide gas during the curing process. This provides, due to the latter effect, excessive discontinuities beyond that which are needed to provide breathable qualities in the cured polymer in the fabric; and, due to the former effect, it provides an excessive stiffening of the fabric. Where the ratio is significantly below 0.6, no particular advantages are provided and excessive plasticization of the cured polymer may result. Where the prepolymer is only partially blocked, the unblocked reactive isocyanate groups present in the prepolymer will react upon contact with some of the curing agent at the time of admixture therewith. This provides no deleterious effects.

The present fabric treatment admixtures are uniformly blended compositions which may be solutions, emulsions or low melting solids. The solids are liquified prior to fabric treatment therewith at temperatures less than 175° F. These admixtures may be 100% solids, and may be used in the treatment process of this invention as is, or may be further admixed with non-reactive liquid diluents to reduce the solids content and facilitate substantial economies and handling ease in their application to the fabrics.

The non-reactive liquid diluents may be added in such quantity to 100% solids admixture compositions to reduce their solids content down to about 0.5% by weight of the final compositions as used on fabrics. Where the admixtures are diluted substantially below 0.5% solids content, substantial handling difficulties are encountered in the fabric treatment process. By "solids content" is meant the weight percent of the prepolymers, blocking agents, curing agents and all other composition components other than non-reactive liquid diluents present in the treatment compositions. By "non-reactive" diluent is meant, according to the present invention, liquids which exhibit substantial inertness to chemical reaction with the curing agent and which are not monofunctional alcohols or amines or mercaptans. Thus, non-reactive liquid diluents useful to the practice here taught include in their number water, and many of the common organic solvents such as the relatively low molecular weight alkanes, chlorinated alkanes, alkanals, ethers and esters, alkanones, benzene and chlorinated aromatics, toluene and its substitution products, etc. Preferred among the non-reactive liquid diluents for present use is water. Where the admixtures of prepolymers, curing agents, non-reactive diluents and adjuvants are miscible, solution fabric treatment compositions are formed; where immiscible or only partially miscible, emulsion compositions of this invention are formed.

The non-reactive diluents useful in the present compositions are those which are relatively volatile, e.g., those which may be substantially volatilized in the open air at temperatures of about 180° F. to about 420° F. in 0.1 minute to 120 minutes.

Adjuvants in intimate admixture with the other components of the treatment compositions of this invention often prove useful for particular purposes. Cure accelerators, pigments, emulsifying agents, wetting agents, colloid stabilizers, bulking agents, sizes, etc. fall into this category. Among the more common cure accelerators which may be employed herein are lead octoate, lead acetyl acetonate, triethylene diamine, lead-2-ethylhexoate, lead benzoate, lead oleate, stannous octoate, etc. Among the more common useful pigments are titanium dioxide, carbon black, iron oxide, silicon dioxide, etc. Among the more common emulsifying agents which may be used are sorbitan monolaurate, sorbitan monopalmitate, sorbitan monostearate, sorbitan tristearate, polyoxyethylene sorbitan monolaurate, polyoxyethylene monopalmitate, etc.

Among the more common colloid stabilizers, sizes and bulking agents which may be used are silicon dioxide, carboxymethyl cellulose, polyacrylic and polymethacrylic acids and esters and metal salts thereof, methyl cellulose, hydroxyethyl cellulose, etc. Adjuvants, where employed, are usually used in quantities which total about 0.05% to 5% by weight of the fabric treatment compositions.

The various useful prepolymers, blocking agents, curing agents, diluents and adjuvants may each be used singly or in combinations of more than one to prepare fabric treatment compositions of this invention.

FABRIC TREATMENT COMPOSITIONS I TO XVII

The following exemplary hydrophilic fabric treatment compositions of this invention were prepared by (a) melting the polyethylene glycols employed at about 140° F., and mixing them with heating with an isomeric mixture of 2,4- and 2,6-toluene diisocyanates in 80% to 20% by weight ratio;

(b) maintaining these reactants in an inert atmosphere and agitated admixture at about 180° F. to temperatures not exceeding about 230° F., for about 1 to 4.5 hours to provide a polyurethane polyether prepolymer having an isocyanate content, in percent reactive-NCO, as listed below;

(c) cooling the prepolymer to about 120° F. to 140° F., and addition thereto of a blocking compound, as listed with mixing to provide a ratio of equivalents of reactive isocyanate of the prepolymer to equivalents of active hydrogen of the blocking compound ($-NCO/OH_B$) as listed, in the blocked prepolymer formed;

(d) cooling the blocked prepolymer to about 100° F. and addition thereto of N,N,N',N'-tetrakis(2-hydroxypropyl)ethylene-diamine with mixing to provide a ratio of equivalents of reactive isocyanate, as present in the prepolymer prior to blocking, to equivalents of active hydrogen of the curing agent ($-NCO/OH_C$) as listed, in the treatment composition admixture;

(e) addition of a non-reactive diluent as listed, to the admixture to form a solution or emulsion composition of this invention with the desired solids content as listed. Occasional addition of a cure accelerator, as listed, was made to some of the compositions at step (e).

| Ingredient or Property | Fabric Treatment Compositions, Type | | | | | | | | | | | | | | | | |
|---|---|---|---|---|---|---|---|---|---|---|---|---|---|---|---|---|---|
| | I | II | III | IV | V | VI | VII | VIII | IX | X | XI | XII | XIII | XIV | XV | XVI | XVII |
| Polyethylene Glycol Used: | | | | | | | | | | | | | | | | | |
| Molecular Weight | 1,540 | 1,540 | 1,540 | 1,540 | 1,540 | 1,540 | 1,540 | 1,540 | 1,540 | 4,000 | 4,000 | 4,000 | 1,540 | 1,540 | 1,540 | 1,540 | 1,540 |
| Acid No.* | 0.24 | 0.24 | 0.24 | 0.24 | 0.24 | 0.24 | 0.24 | 0.24 | 0.24 | 0.22 | 0.22 | 0.22 | 0.24 | 0.01 | 0.01 | 0.01 | 0.01 |
| Hydroxyl No.* | 91 | 91 | 91 | 91 | 91 | 91 | 91 | 91 | 91 | 136 | 136 | 136 | 91 | 90 | 90 | 90 | 90 |
| Water Content, percent* | 0.65 | 0.65 | 0.65 | 0.65 | 0.65 | 0.65 | 0.65 | 0.65 | 0.65 | 0.48 | 0.48 | 0.48 | 0.65 | 0.5 | 0.5 | 0.5 | 0.5 |
| Polyethylene Glycol, pbw | 74 | 74 | 74.3 | 74.3 | 74.3 | 74.3 | 74.3 | 74.3 | 74.3 | 85.8 | 85.8 | 85.8 | 82.5 | 78.4 | 78.4 | 78.4 | 78.4 |
| 2,4/2,6 toluene diisocyanate, pbw | 26 | 26 | 25.7 | 25.7 | 25.7 | 25.7 | 25.7 | 25.7 | 25.7 | 14.2 | 14.2 | 14.2 | 17.5 | 21.6 | 21.6 | 21.6 | 21.6 |
| Prepolymer, percent reactive NCO* | 6.94 | 6.94 | 6.67 | 6.67 | 6.67 | 6.67 | 6.67 | 6.67 | 6.67 | 2.30 | 2.30 | 2.30 | 2.34 | 4.46 | 4.46 | 4.46 | 4.46 |
| Blocking Agent Used: | | | | | | | | | | | | | | | | | |
| Ethylenimine, pbw | 7.1 | 7.1 | | | | | | | | | | | | | | | |
| Methylethylketoxime, pbw | | | 13.8 | 13.8 | 13.8 | 13.8 | 13.8 | 13.8 | 13.8 | 4.76 | 4.76 | 4.76 | 4.2 | 9.24 | 9.24 | 9.24 | 9.24 |
| ($-NCO/-OH_B$) ratio | 1.0 | 1.0 | 1.0 | 1.0 | 1.0 | 1.0 | 1.0 | 1.0 | 1.0 | 1.0 | 1.0 | 1.0 | 1.15 | 1.0 | 1.0 | 1.0 | 1.0 |
| Curing Agent Used: | | | | | | | | | | | | | | | | | |
| N,N,N',N'-tetrakis (2-hydroxypropyl)-ethylenediamine, pbw | 10.5 | 10.5 | 10.1 | 10.1 | 10.1 | 10.1 | 10.1 | 10.1 | 10.1 | 3.48 | 3.48 | 3.48 | 3.5 | 6.74 | 6.74 | 6.74 | 6.74 |
| ($-NCO/-OH_C$) ratio | 1.15 | 1.15 | 1.15 | 1.15 | 1.15 | 1.15 | 1.15 | 1.15 | 1.15 | 1.15 | 1.15 | 1.15 | 1.15 | 1.15 | 1.15 | 1.15 | 1.15 |
| Non-reactive Diluent Used: | | | | | | | | | | | | | | | | | |
| Water, pbw | 1,590 | | | | | | | 1,607 | 742 | | 2,061 | 976 | | 46.8 | 46.8 | 2,204 | 1,044 |
| Toluene, pbw | | | | | | | | | | | | | 44.4 | | | | |
| Methyl Cellosolve acetate, pbw | | | | | | 6 | | | | | | | | | | | |
| Cellosolve acetate, pbw | | | 47 | 28 | 12 | | | | | | | | | | | | |
| Lead Octoate, cure accelerator, pbw | | | | | | | | 8.6 | 4.3 | | | | | | 0.8 | | |
| Percent Solids Content | 10 | 100 | 70 | 80 | 90 | 95 | 100 | 7.15 | 14.3 | 100 | 5 | 10 | 70 | 70 | 70 | 5 | 10 |
| Type Composition Formed at 80° F.—Solution (S), Emulsion (E), Waxy Solid (W) | S | W | S | S | S | S | W | E | E | W | S | S | E | S | S | S | S |

*By chemical analysis.

The above compositions, which were 100% solids content, were waxy, low melting solids that may be liquified prior to use on fabrics with only moderate heating; the solution and emulsion compositions were of from 5% to 95% solids content. At 100% solids content, solid or liquid compositions may be formed. The physical state seems to depend upon whether the polyglycols used are solids or liquids. The polyglycols with molecular weights of less than about 500 are usually liquid at 80° F.

FABRIC TREATMENT COMPOSITIONS XVIII TO XXI

In manner similar to that used for Compositions I to XVII, the following liquid fabric treatment compositions of this invention may be prepared:

| Ingredient or Property | Composition | | | |
| --- | --- | --- | --- | --- |
| | XVIII | XIX | XX | XXI |
| Polyethylene Glycol: | | | | |
| Molecular Weight | 1,540 | 6,000 | 750 | 200 |
| Equivalent Weight, maximum | 770 | 3,000 | 375 | 100 |
| Parts by weight in composition* | 25 | 75 | 50 | 100 |
| Polypropylene Glycol: | | | | |
| Molecular Weight | 4,000 | 2,025 | 1,025 | |
| Equivalent Weight, maximum | 2,000 | 1,013 | 513 | |
| Parts by weight in composition* | 75 | 25 | 50 | |
| Diisocyanate: | | | | |
| Toluene diisocyanate, pbw* | 10.25 | | | 113 |
| Hexamethylene diisocyanate, pbw* | | 6.7 | | |
| Furfural diisocyanate, pbw* | | | 38 | |
| Prepolymer, percent reactive (NCO)* | 2.25 | 1.18 | 7.0 | 16 |
| Blocking Compound: | | | | |
| Propylenimine, pbw | 1.47 | | | |
| Cyclohexanoneoxime, pbw | | 26.9 | | |
| Methylmethylketoxime, pbw | | | 17.4 | |
| Methylethylketoxime, pbw | | | | 22.1 |
| Ratio (—NCO/—OHb) | 2.0 | 0.5 | 9.7 | 1.5 |
| Curing Agent: | | | | |
| Trimethylolpropane, pbw | 2.68 | | | |
| Triisopropanolamine, pbw | | 0.99 | | |
| N,N,N′,N′-tetrakis(2-hydroxypropyl)-ethylenediamine, pbw | | | 9.36 | |
| Propylene glycol, pbw | | | | 24.1 |
| Ratio (—NCO/—OHc) | 0.9 | 1.5 | 1.3 | 0.6 |
| Non-reactive diluent: | | | | |
| Methylene chloride, pbw | 212.6 | | | |
| Water, pbw | | 36,983 | 164.8 | |
| Acetone, pbw | | | | 12,701 |
| Percent Solids Content | 35 | 0.5 | 50 | 2 |

*Based on the maximum equivalent weight of the polyglycols as listed.

The fabric treatment compositions of this invention may be used to treat both woven and non-woven fabrics prepared from both natural fibers such as cotton, wool, cellulose, flax, etc., and synthetic fibers such as artificial silk, polyesters, polyurethanes, polyamides, polyethers, polyolefins, etc. The woven fabrics may be in the form of denims, gabardines, khakis, drills, twills, jeans, tickings, tapes, bindings, etc. By "untreated" fabrics is meant fabrics not as yet treated with the present compositions.

The wetting of untreated fabric with the treatment compositions may be by any of the methods known to the art, such as by spraying, padding, immersion, roller coating, etc. The treatment compositions where waxy solids may easily be made liquid by moderate heating prior to use at temperatures of about 100 to 175° F. The fabrics will pick up the treatment compositions of this invention when liquid and be coated thereby as in the case of nylon and/or be impregnated thereby as in the case of cotton. The wetted fabrics are then heated to temperatures of about 180° F. to 420° F. to dry them and to cure the prepolymer to form solid, hydrophilic polymer bound to the fabric. In this drying and cure step, the at-least-partially-blocked prepolymers are substantially unblocked and reconstituted; the blocking compound is also reconstituted and then is substantially removed from the fabric by volatilization. Although the mechanism for producing breathable fabrics is not wholly understood, it is believed that during the unblocking process discrete and minute discontinuities are produced in the composition films formed in the now coated and/or impregnated fabrics that in turn ultimately maintain desirable breathability qualities in the treated fabric after cure of the prepolymer. The non-reactive diluent, where used, is also removed by volatilization during this step. The freed or unblocked isocyanate groups of the reconstituted prepolymer then react in a curing or crosslinking action with the admixed curing agent to provide solid, hydrophilic polymer bound to the fabric. The treated, dry fabric will, according to the invention, increase in weight due to the addition of hydrophilic polymer bound thereto; this is called "polymer-pickup." Most preferably polymer-pickup of about 0.5% to 50% by weight is sought in present practice here taught. Where polymer-pickup is substantially less than desired, the treated fabric may again be wetted with the treatment compositions and heated to dry and cure the compositions so added, thus increasing the weight of hydrophilic polymer bound thereto to the desired level of polymer-pickup. With the most preferred treatment compositions of this invention, the wetted fabrics may be heated to about 180° F. to 420° F. for periods of about 0.1 minute to 120 minutes to provide the dry, polymer-treated fabrics. The moisture treatment step of the present process may then be carried out by subjecting the dry, polymer-treated fabric to an environment of water-moisture equivalent of at least 50% relative humidity at 73° F. for such periods of time as will permit a gain in weight of the treated fabric at least equal to about 10% and most preferably about 100% by weight of the weight of the hydrophilic polymer bound therein. This moisture treatment may be carried out by merely exposing the treated fabric to air bearing moisture, or to steam, or by spraying water onto the treated fabric, or by padding, immersing or roller coating the fabric with water. This may be accomplished in periods of at least 0.1 minute to 1 week. Excess or unbound moisture that is not taken up by the bound hydrophilic polymer may be removed by airing the fabric. The novel moisture-containing treated fabrics thus provided are substantially static-resistant, breathable, and exhibit enhanced softness, drape and handle.

Examples of the treatment process and moisture-containing, breathable treated fabrics thereby provided are given below to demonstrate specific embodiments of this invention, but not to act as a limitation upon its scope.

Examples 1 to 15

In the following examples, swatches of woven fabrics, wool, nylon, and cotton, were dipped into fabric treatment compositions of this invention to wet them. They were then dried at elevated temperatures of about 250° F. for about 0.5 hour to unblock the prepolymer, volatilize and remove the blocking compound, cure the prepolymer to a solid polymer, volatilize, and remove the non-reactive diluent; and to provide thereby a polymer-pickup in the fabrics of about 7% to 32% by weight. The now dried coated and/or impregnated fabrics were then exposed to atmospheres of 50% and 100% (RH) relative humidity in air at about 73° F. for various intervals of time. The treated fabrics substantially increased in weight with time of exposure and increasing RH due to moisture-pickup. The moisture-pickup was measured, and is reported below as increases in the weights of the fabrics, and also as the percent by weight based on the weight of the moisture-containing, treated fabrics.

The novel moisture-containing treated fabrics provided in these examples show substantial resistance to accumulation of static electricity, are breathable, and show an enhanced richness in feel over that of untreated fabrics. The latter quality is manifest in increased softness, better drape, and more luxurious handle of the treated fabrics.

| Example | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Weight of Fabric Prior to Treatment, in pbw | 209 | 227 | 208 | 107 | 100 | 103 | 249 | 235 | 251 | 136 | 133 | 139 | 121 | 112 | 117 |
| Type of Fabric [1] | W | W | W | N | N | N | W | W | W | N | N | N | C | C | C |
| Fabric Treatment Composition, Type | ([2]) | VIII | IX | ([2]) | VIII | IX | ([2]) | XI | XII | ([2]) | XI | XII | ([2]) | XI | XII |
| Polymer-Pickup After Drying, in Wt. Percent of Treated Fabric | 0.0 | 18.1 | 30.3 | 0.0 | 9.1 | 16.3 | 0.0 | 13.3 | 34.1 | 0.0 | 7.0 | 14.2 | 0.0 | 8.2 | 17.4 |
| Weight of Fabric After Drying and Cure, in pbw | 209 | 277 | 298 | 107 | 110 | 123 | 249 | 271 | 351 | 136 | 143 | 162 | 121 | 122 | 141 |
| Moisture-Pickup of Fabric: | | | | | | | | | | | | | | | |
| Weight of Moisture-Containing Fabric, in pbw: | | | | | | | | | | | | | | | |
| After 24 hrs. at 50% RH and 73° F | | | | | | | 248 | 286 | 366 | | | | | | |
| After 120 hrs | | | | | | | 249 | 287 | 368 | | | | | | |
| After 24 hrs. at 100% RH and 73° F | | | | | | | | | | | | | 130 | 138 | 165 |
| After 72 hrs | 248 | 338 | 389 | 108 | 118 | 137 | 280 | 346 | 471 | 138 | 148 | 182 | | | |
| Percent Moisture-Pickup of Fabric: | | | | | | | | | | | | | | | |
| After 24 hrs. at 50% RH and 73° F | | | | | | | 0.0 | 5.2 | 4.1 | | | | | | |
| After 120 hrs | | | | | | | 0.0 | 5.6 | 4.6 | | | | | | |
| After 24 hrs. at 100% RH and 73° F | | | | | | | | | | | | | 6.9 | 11.6 | 4.5 |
| After 72 hrs | 15.7 | 18 | 23.4 | 0.9 | 6.8 | 10.2 | 11.1 | 21.6 | 25.5 | 1.4 | 3.4 | 11.0 | | | |

[1] W=Wool; C=Cotton; N=Nylon.  [2] Fabric not treated; control example.

I claim:
1. A process for preparing a static-resistant moisture-containing, breathable, treated fabric of improved softness, drape and handle comprising the steps of
   (a) wetting a fabric with a fabric treatment composition which comprises
      (I) an at-least-partially blocked hydrophilic polyurethane prepolymer prepared from
         (i) polyglycols, at least 25% by weight of which are polyethylene glycols having molecular weights from about 200 to about 6,000,
         (ii) organic diisocyanate in such quantities as to provide polyurethane prepolymers having an isocyanate content in terms of reactive isocyanate of about 1% to 16% by weight of said prepolymer, and
         (iii) a heat-labile organic blocking compound having a molecular weight under about 150 and selected from the group consisting of oximes, ketoximes and imines in such quantities as to provide a ratio in equivalents of reactive isocyanate in said prepolymer prior to blocking to equivalents of reactive hydrogen in said blocking compound of 0.5 to 2.0, and
      (II) organic curing agent compound for said prepolymer in intimate uniform admixture therewith and in such quantities as to provide a ratio in equivalents of reactive hydrogen in said organic curing agent compound of 0.6 to 1.5;
   (b) heating said wetted fabric to a temperature of at least 180° F. for the period of time to provide substantial unblocking of said blocked prepolymer, substantial curing of the now unblocked prepolymer to form a cured solid, hydrophilic, polyurethane polymer bound in said fabric, and substantial drying of said wetted fabric; and
   (c) subjecting the dry, polymer-treated fabric provided by step (b) to an environment of water-moisture at least equivalent to that containing in air of at least 50% relative humidity at 73° F. for the period of time to provide an increase in the weight of said treated fabric of at least 10% by weight of the weight of the dry, cured polymer bound in said fabric.

2. A process for preparing a static-resistant, moisture-containing treated fabric as in claim 1 wherein said wetting of said fabric provides a polymer pick-up in the fabric after drying of from 0.5% to 50% by weight of the weight of said dry, polymer-treated fabric.

3. A process for preparing a static-resistant, moisture-containing treated fabric as in claim 1 wherein said heating of said wetted fabric is for 0.1 minute to 120 minutes at 180° F. to 420° F.

4. A process for preparing a static-resistant, moisture-containing treated fabric as in claim 1 wherein said subjecting said dry, treated fabric to an environment of water-moisture is for a period of at least 0.1 minute to 1 week.

5. A process for preparing a static-resistant, moisture-containing treated fabric as in claim 1 wherein said subjecting said dry, treated fabric to an environment of water-moisture provides an increase in the weight of said treated-fabric of about at least 50% to 100% by weight of the weight of the dry, cured polymer bound in said fabric.

6. A process as in claim 1 wherein said fabric treatment composition further comprises a liquid non-reactive diluent.

7. A process as in claim 1 wherein said fabric treatment composition is a waxy solid at 80° F. and a liquid between 100° F. and 175° F.

8. A process as in claim 4 wherein said subjecting said dry, treated fabric is to an environment of air containing moisture to the extent of at least 50% relative humidity at 73° F. is for a period of at least 24 hours.

9. A process in claim 6 wherein said fabric treatment composition is in the form of a solution.

10. A process as in claim 6 wherein said fabric treatment composition is in the form of an emulsion.

References Cited

UNITED STATES PATENTS

| | | | |
|---|---|---|---|
| 2,862,281 | 12/1958 | Klausner | 117—161 |
| 2,993,813 | 7/1961 | Tischbein | 260—77.5 X |
| 3,000,757 | 9/1961 | Johnston et al. | 117—63 |
| 3,100,721 | 8/1963 | Holden | 117—135.5 |
| 3,135,711 | 6/1964 | Thoma et al. | 117—161 |
| 3,152,920 | 9/1964 | Caldwell et al. | 117—138.8 |
| 3,208,875 | 9/1965 | Holden | 117—63 X |
| 3,169,885 | 2/1965 | Goldner et al. | 117—135.5 |
| 3,190,766 | 6/1965 | Yuan | 117—63 |
| 2,657,151 | 10/1953 | Gensel et al. | 117—47 |
| 2,721,811 | 10/1955 | Dacey et al. | 117—161 |
| 3,136,654 | 6/1964 | Craver | 117—119.8 |
| 3,265,529 | 8/1966 | Caldwell et al. | 117—135.5 |

WILLIAM D. MARTIN, *Primary Examiner.*

T. G. DAVIS, *Assistant Examiner.*